US008647738B2

(12) United States Patent
Endo

(10) Patent No.: US 8,647,738 B2
(45) Date of Patent: Feb. 11, 2014

(54) FILM

(75) Inventor: Kohei Endo, Iwakuni (JP)

(73) Assignee: Teijin Limited, Osaka (JP)

( * ) Notice: Subject to any disclaimer, the term of this patent is extended or adjusted under 35 U.S.C. 154(b) by 17 days.

(21) Appl. No.: 12/677,262

(22) PCT Filed: Sep. 10, 2008

(86) PCT No.: PCT/JP2008/066800
§ 371 (c)(1),
(2), (4) Date: Mar. 9, 2010

(87) PCT Pub. No.: WO2009/035127
PCT Pub. Date: Mar. 19, 2009

(65) Prior Publication Data
US 2010/0182694 A1 Jul. 22, 2010

(30) Foreign Application Priority Data
Sep. 10, 2007 (JP) ................. 2007-234059

(51) Int. Cl.
*B32B 1/02* (2006.01)
*B32B 27/32* (2006.01)
*B32B 27/36* (2006.01)

(52) U.S. Cl.
USPC ......... 428/220; 428/34.9; 428/35.7; 428/483; 525/190

(58) Field of Classification Search
USPC ................. 428/34.9, 35.7, 220, 483; 525/190
See application file for complete search history.

(56) References Cited

U.S. PATENT DOCUMENTS

2008/0262146 A1* 10/2008 Yonezawa et al. ............ 524/560

FOREIGN PATENT DOCUMENTS

| JP | 2004-107630 A | 4/2004 |
| JP | 2006-227090 A | 8/2006 |
| JP | 2006-243610 A | 9/2006 |
| JP | 2007-119553 A | 5/2007 |
| JP | 2007-119729 A | 5/2007 |
| JP | 2007-191630 A | 8/2007 |
| JP | 2007-191688 A | 8/2007 |
| WO | 2006/077776 A1 | 7/2006 |
| WO | 2007/061041 A1 | 5/2007 |

OTHER PUBLICATIONS

Introduction to Chemistry No. 39, 1998 (published by the Academic Society Publishing Center), p. 111.
Sawai et al.: Development of Oriented Morphology and Mechanical Properties upon Drawing of Stereo-Complex of Poly(L-lactic acid) and Poly(D-lactic acid) by Solid-State Coextrusion; Polymer Journal, vol. 39, No. 9, pp. 953-960 (2007).

* cited by examiner

*Primary Examiner* — Ana Woodward
(74) *Attorney, Agent, or Firm* — Sughrue Mion, PLLC

(57) ABSTRACT

A film made of a resin composition which includes polylactic acid (component A) composed of poly(L-lactic acid) and poly(D-lactic acid) and acrylic resin (component B) and has a crystal melting peak at 190° C. or higher when measured by a scanning differential calorimeter (DSC). The film has a small change in birefringence caused by external force, excellent dimensional stability at the time of heating and a small change in birefringence caused by heat stress.

10 Claims, No Drawings

FILM

TECHNICAL FIELD

The present invention relates to a film which is suitable for use as an optical film such as a polarizing plate protective film or phase difference film.

BACKGROUND OF THE ART

Biodegradable polymers which decompose in the natural environment have been attracting attention from the viewpoint of the preservation of the global environment, and various biodegradable polymers have been developed. Out of these, polylactic acid has high transparency, can be melt molded, can be manufactured economically from biomass by fermentation using a microorganism and is expected to be used as an optical material.

Along with the expansion of the display market, demand for more clear images is growing and a material which has not only transparency but also higher optical properties is desired.

In general, birefringence occurs in polymers due to a difference in refractive index between the direction of the molecular main chain and a direction perpendicular to that direction. Birefringence must be controlled precisely according to application purpose and needs to be small in the case of a polarizing plate protective film which is used in a liquid crystal polarizing plate.

A triacetyl cellulose (TAC) film has been often used as the polarizing plate protective film. Along with the spread of displays such as large-sized liquid crystal displays and plasma displays, required films have been becoming large in size and the need to reduce a birefringence change distribution has been becoming large. Therefore, a material which has a small change in birefringence caused by external force, excellent dimensional stability at the time of heating and a small change in birefringence caused by heat stress is desired. That is, an optical material which has a small photoelastic coefficient and a small heat shrinkage factor is desired.

There are known TAC homopolymer and methyl methacrylate homopolymer (PMMA) as optical materials having a small photoelastic coefficient. There is also known amorphous polyolefin (APO) (non-patent document 1). However, these materials have a problem such as a large change in birefringence caused by external force or too low polarity.

Further, a material comprising acrylic resin and polylactic acid is proposed as an optical material having a small photoelectric coefficient. A film made of this material has a photoelectric coefficient of more than $-13\times10^{-12}$/Pa and less than $12\times10^{-12}$/Pa (patent document 1). However, this material has large heat shrinkage by heating and a disadvantage that, when it is used as a polarizing plate protective film, the difference in birefringence changes by the generated heat stress. Therefore, the development of a material which has a small photoelastic coefficient, a small change in the difference of birefringence caused by external stress, excellent dimensional stability at the time of heating and suppresses the generation of heat stress is awaited.

(non-patent document 1) Introduction to Chemistry No. 39, 1998 (published by the Academic Society Publishing Center)

(patent document 1) JP-A 2006-227090

DISCLOSURE OF THE INVENTION

It is therefore an object of the present invention to provide a film which has a small change in birefringence caused by external force, excellent dimensional stability at the time of heating and a small change in birefringence caused by heat stress.

The inventors of the present invention have found that when stereocomplex polylactic acid having a crystal melting peak at 190° C. or higher when measured by a differential scanning calorimeter (DSC) is used as component A in a film made of a resin composition comprising polylactic acid (component A) and acrylic resin (component B), a film which has small birefringence, a small change in birefringence caused by external force, a small dimensional change caused by heating and small thermal fluctuations in birefringence caused by heat stress is obtained. The present invention has been accomplished based on this finding.

That is, the object of the present invention can be attained by the following.

(1) A film made of a resin composition which comprises polylactic acid (component A) composed of poly(L-lactic acid) and poly(D-lactic acid) and acrylic resin (component B) and has a crystal melting peak at 190° C. or higher when measured by a differential scanning calorimeter (DSC).

(2) The film according to (1), wherein the weight ratio (A/B) of the polylactic acid (component A) to the acrylic resin (component B) is 90/10 to 50/50.

(3) The film according to (1) or (2) which has an absolute value of photoelastic coefficient of less than $10\times10^{-12}$/Pa.

(4) The film according to any one of (1) to (3), wherein the phase difference (Re) in the plane direction of the film defined by the following equation (ii) and the phase difference (Rth) in the thickness direction defined by the following equation (iii) are both 10 nm or less.

$$Re=(nx-ny)\times d \quad \text{(ii)}$$

$$Rth=((nx+ny)/2-nz)\times d \quad \text{(iii)}$$

(nx represents a refractive index in the longitudinal direction, ny represents a refractive index in the transverse direction, nz represents a refractive index in the thickness direction, and d represents a thickness (nm).)

(5) The film according to any one of (1) to (4), wherein the stereo crystal rate (S) defined by the following equation (i) is 80% or more.

$$S(\%)=[\Delta Hms/(\Delta Hmh+\Delta Hms)]\times 100 \quad \text{(i)}$$

($\Delta Hms$ represents the crystal melting enthalpy (J/g) of stereocomplex-phase polylactic acid, and $\Delta Hmh$ represents the crystal melting enthalpy (J/g) of homo-phase polylactic acid.)

(6) The film according to any one of (1) to (5) which has a heat shrinkage factor in the longitudinal direction and the transverse direction of 5% or less when it is heated at 90° C. for 5 hours.

(7) The film according to any one of (1) to (6), wherein the storage elastic modulus E' in the measurement of dynamic viscoelasticity (DMA) does not take a minimum value at a temperature range from normal temperature (25° C.) to 150° C. and has a value larger than $0.5\times10^8$ Pa.

(8) The film according to any one of (1) to (7) which has a stereo crystallinity (K) defined by the following equation (iv) of 10 to 60%.

$$K=(\Delta Hms-\Delta Hc)/142 \quad \text{(iv)}$$

($\Delta Hms$ represents the crystal melting enthalpy (J/g) of stereocomplex-phase polylactic acid, $\Delta Hc$ represents the crystallization enthalpy (J/g) of polylactic acid, and 142 (J/g) represents the equilibrium melting enthalpy of the stereocomplex polylactic acid crystal.)

(9) A polarization plate protective film which is the film of any one of (1) to (8).
(10) A phase difference film which is the film of any one of (1) to (9).

BEST MODE FOR CARRYING OUT THE INVENTION

The present invention will be described hereinunder.

The film of the present invention is obtained by molding a resin composition comprising polylactic acid (component A) composed of poly(L-lactic acid) and poly(D-lactic acid) and acrylic resin (component B) as essential components and having a crystal melting peak at 190° C. or higher when measured by a differential scanning calorimeter (DSC). The crystal melting peak which appears at 190° C. or higher is the crystal melting peak of stereocomplex-phase (may be referred to as "complex-phase" hereinafter) polylactic acid.

<Polylactic Acid: Component A>

The polylactic acid (component A) contains stereocomplex polylactic acid which is composed of poly(L-lactic acid) and poly(D-lactic acid). The poly(L-lactic acid) and the poly(D-lactic acid) are essentially composed of an L-lactic acid unit and a D-lactic acid unit represented by the following formula (1), respectively.

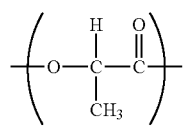

(1)

The word "essentially" means that the component accounts for preferably 75 mol % or more, more preferably 90 mol % or more, much more preferably 95 mol % or more of the total of all the components.

The content of the L-lactic acid unit in the poly(L-lactic acid) is preferably 90 to 100 mol %, more preferably 95 to 100 mol %, much more preferably 97.5 to 100 mol %. To achieve a high melting point, it is 99 to 100 mol %. A D-lactic acid unit and a unit other than lactic acid are used as other units. The total content of the other units is preferably 0 to 10 mol %, more preferably 0 to 5 mol %, much more preferably 0 to 2 mol %.

The content of the D-lactic acid unit in the poly(D-lactic acid) is preferably 90 to 100 mol %, more preferably 95 to 100 mol %, much more preferably 97.5 to 100 mol %. To achieve a high melting point, it is 99 to 100 mol %. A D-lactic acid unit and a unit other than lactic acid are used as other units. The total content of the other units is preferably 0 to 10 mol %, more preferably 0 to 5 mol %, much more preferably 0 to 2 mol %.

Examples of the unit other than lactic acid include units derived from dicarboxylic acids, polyhydric alcohols, hydroxycarboxylic acids and lactones having a functional group capable of forming two or more ester bonds, and units derived from polyesters, polyethers and polycarbonates comprising these constituent components.

The above dicarboxylic acids include succinic acid, adipic acid, azelaic acid, sebacic acid, terephthalic acid and isophthalic acid. The above polyhydric alcohols include aliphatic polyhydric alcohols such as ethylene glycol, propylene glycol, butanediol, pentanediol, hexanediol, octanediol, glycerin, sorbitan, neopentyl glycol, diethylene glycol, triethylene glycol, polyethylene glycol and polypropylene glycol, and aromatic polyhydric alcohols such as bisphenol and ethylene oxide adducts thereof. The above hydroxycarboxylic acids include glycolic acid, hydroxybutyric acid and p-oxybenzoic acid. The above lactones include glycolide, ε-caprolactone, β-propiolactone, δ-butyrolactone, β- or γ-butyrolactone, pivalolactone and δ-valerolactone.

The weight average molecular weights of the poly(L-lactic acid) and the poly(D-lactic acid) are preferably 100,000 to 500,000, more preferably 110,000 to 350,000, much more preferably 120,000 to 250,000 to obtain both the mechanical properties and moldability of the resin composition.

The poly(L-lactic acid) and the poly(D-lactic acid) can be manufactured by a conventionally known method. For example, they can be manufactured by heating L- or D-lactide in the presence of a metal-containing catalyst and ring-opening polymerizing it. They can also be manufactured by crystallizing polylactic acid having a low molecular weight which contains a metal-containing catalyst and heating and solid-phase polymerizing it under reduced pressure or increased pressure in the presence or absence of an inert gas stream. Further, they can be manufactured by dehydrating and condensing lactic acid in the presence or absence of an organic solvent and directly polymerizing it.

A polymerization reaction can be carried out in a conventionally known reactor such as a vertical reactor or horizontal reactor having a helical ribbon blade or high-viscosity agitation blade. They may be used alone or in combination. A batch reactor, continuous reactor and semibatch reactor may also be used alone or in combination.

An alcohol may be used as a polymerization initiator. The alcohol is preferably a nonvolatile alcohol which does not impede the polymerization of the polylactic acid, such as decanol, dodecanol, tetradecanol, hexadecanol or octadecanol.

In the solid-phase polymerization, polylactic acid having a relatively low molecular weight (about 15 to 203) obtained by the above ring-opening polymerization or the direct polymerization of lactic acid is used as a prepolymer. It is preferred from the viewpoint of the prevention of the fusion of a resin pellet that the prepolymer should be crystallized at a temperature equal to or higher than its glass transition temperature and lower than its melting point in advance. The crystallized prepolymer is charged into a fixed vertical or horizontal reactor or rotary reactor (such as rotary kiln) whose vessel rotates, such as tumbler or kiln to be heated at a temperature equal to or higher than the glass transition temperature of the prepolymer and lower than its melting point. The polymerization temperature may be raised stepwise along with the proceeding of polymerization. The reduction of the inside pressure of the above reactor and the circulation of the heated inert gas stream are preferably carried out in order to remove water generated during the solid-phase polymerization efficiently.

It is preferred that the metal-containing catalyst used at the time of polymerizing the polylactic acid should be inactivated with a conventionally known deactivator before use because the stability to heat and water of the polylactic acid (component A) and the resin composition can be improved.

An example of the deactivator is an organic ligand consisting of chelate ligands which have an imino group and can coordinate to the polymerization metal catalyst.

Low oxidation number phosphoric acids having a small acid number of 5 or less such as dihydride oxophosphoric acid (I), dihydride tetraoxodiphosphoric acid (II,II), hydride trioxophosphoric acid (III), dihydride, pentaoxodiphosphoric acid (III), hydride, pentaoxodiphosphoric acid (II, IV), dodecaoxohexaphosphoric acid (III), hydride octaoxotriphosphoric acid (III, IV, IV), octaoxotriphosphoric acid (IV, III, IV), hydride hexaoxodiphosphoric acid (III, V), hexaoxodiphosphoric acid (IV), decaoxotetraphosphoric acid (IV), hendecaoxotetraphosphoric acid (VI) and enneaoxotriphosphoric acid (V, IV, IV) are also used as the deactivator.

Orthophosphoric acids represented by the formula $xH_2O \cdot yP_2O_5$ and satisfying $x/y=3$ and polyphosphoric acids called "diphosphoric acid, triphosphoric acid, tetraphosphoric acid and pentaphosphoric acid" according to the degree of condensation and satisfying $2>x/y>1$ and mixtures thereof may also be used.

Metaphosphoric acids satisfying $x/y=1$, especially trimetaphosphoric acid and tetrametaphosphoric acid, and ultraphosphoric acids having a net structure with part of the phosphorus pentaoxide structure and satisfying $1>x/y>0$ (may be collectively referred to as "metaphosphoric acid-based compounds") may also be used. Further, acidic salts of these acids, monohydric and polyhydric alcohols, partial esters and whole esters of polyalkylene glycols and phosphono-substituted lower aliphatic carboxylic acid derivatives may also be used.

From the viewpoint of catalyst deactivation capability, orthophosphoric acids represented by the formula $xH_2O \cdot yP_2O_5$ and satisfying $x/y=3$ are preferred. Polyphosphoric acids called "diphosphoric acid, triphosphoric acid, tetraphosphoric acid and pentaphosphoric acid" according to the degree of condensation and satisfying $2>x/y>1$ and mixtures thereof are preferred. Metaphosphoric acids satisfying $x/y=1$, especially trimetaphosphoric acid and tetrametaphosphoric acid are also preferred. Ultraphosphoric acids having a net structure with part of the phosphorus pentaoxide structure and satisfying $1>x/y>0$ (may be collectively referred to as "metaphosphoric acid-based compounds") are preferred. Acidic salts of these acids, monohydric and polyhydric alcohols, partial esters of polyalkylene glycols and oxophosphoric acids, and acid esters thereof, and phosphono-substituted lower aliphatic carboxylic acid derivatives are advantageously used.

The metaphosphoric acid-based compounds include cyclic metaphosphoric acids in which 3 to 200 phosphoric acid units are condensed, ultra-region metaphosphoric acids having a solid net structure, and (alkali metal salts, alkali earth metal salts and onium salts) thereof. Out of these, cyclic sodium metaphosphate, ultra-region sodium metaphosphate and dihexylphosphonoethyl acetate (may be abbreviated as DHPA hereinafter) of a phosphono-substituted lower aliphatic carboxylic acid derivative are advantageously used.

In the polylactic acid (component A), the weight ratio of poly(L-lactic acid) to poly(D-lactic acid) is 90:10 to 10:90. The weight ratio is preferably 75:25 to 25:75, more preferably 60:40 to 40:60, much more preferably a range as close to 50:50 as possible to improve the stereo crystal rate (S) and stereo crystallinity (K) of the polylactic acid (component A) and increase the crystal melting temperature of the complex-phase polylactic acid.

The weight average molecular weight of the polylactic acid (component A) is preferably selected from a range from 100,000 to 500,000 to obtain both the moldability and physical properties of the resin composition. It is more preferably 100,000 to 300,000, much more preferably 110,000 to 250,000.

The weight average molecular weight is a weight average molecular weight in terms of standard polystyrene measured by gel permeation chromatography (GPC) using chloroform as an eluent.

Further, the polylactic acid (component A) used in the present invention has a stereo crystal rate (S) defined by the following equation (i) and obtained from its crystal melting peak intensity of preferably 80% or more when measured by DSC. That is, in the polylactic acid (component A), the stereocomplex phase is preferably formed fully.

$$S(\%)=[\Delta Hms/(\Delta Hmh+\Delta Hms)] \times 100 \quad (i)$$

In the above equation, $\Delta Hms$ represents the crystal melting enthalpy of the stereocomplex-phase polylactic acid. $\Delta Hmh$ represents the crystal melting enthalpy of the homo-phase polylactic acid. In the DSC measurement, the crystal melting peak which appears at 190° C. or higher is a crystal melting peak attributed to the melting of the stereocomplex-phase polylactic acid and the crystal melting peak which appears at a temperature lower than 190° C. is a crystal melting peak attributed to the melting of the homo-phase polylactic acid. The stereo crystal rate (S) is a parameter indicative of the proportion of the stereocomplex polylactic acid crystal formed in the end in the heat treatment step.

When the polylactic acid (component A) has the above stereo crystal rate (S), the dimensional stability and high-temperature mechanical properties of the film of the present invention can be improved.

(Crystal Melting Temperature)

The crystal melting temperature of the polylactic acid (component A) is preferably 190 to 250° C., more preferably 200 to 220° C. The crystal melting enthalpy is preferably 20 J/g or more, more preferably 30 J/g or more.

(Manufacture of Polylactic Acid (Component A))

The polylactic acid (component A) can be manufactured by contacting poly(L-lactic acid) and poly(D-lactic acid) to each other in a predetermined weight ratio.

The above contact may be carried out in the presence of a solvent. The solvent is not particularly limited if it dissolves the poly(L-lactic acid) and the poly(D-lactic acid). Preferred examples of the solvent include chloroform, methylene chloride, dichloroethane, tetrachloroethane, phenol, tetrahydrofuran, N-methylpyrrolidone, N,N-dimethylformamide, butyrolactone, trioxane and hexafluoroisopropanol which may be used alone or in combination of two or more.

The poly(L-lactic acid) and the poly(D-lactic acid) may be mixed together in the absence of a solvent. That is, predetermined amounts of the poly(L-lactic acid) and the poly(D-lactic acid) are mixed together and melt kneaded together, or one of them is molten and the other is added to and kneaded with the molten one.

Alternatively, the contact may be carried out by chemical bonding. For example, as for polylactic acid as a block polymer in which a poly(L-lactic acid) segment and a poly(D-lactic acid) segment are bonded together, the complex phase is easily formed fully, and the stereoblock polylactic acid may be advantageously used in the present invention.

This block polymer may be used as long as it is a block copolymer having the above basic constitution whether it is manufactured by sequential ring-opening polymerization, by polymerizing poly(L-lactic acid) and poly(D-lactic acid) and then bonding them together by a chain exchange reaction or with a chain extender, polymerizing poly(L-lactic acid) and poly(D-lactic acid), blending them together and solid-phase polymerizing the blend to extend the chain, or manufactured from racemilactide using a stereoselective ring-opening polymerization catalyst or not.

However, the stereoblock polymer having a high melting point obtained by sequential ring-opening polymerization and the polymer obtained by solid-phase polymerization are preferably used from the viewpoint of manufacturing ease.

Specific additives are preferably added to the polylactic acid (component A) used in the present invention in limits not prejudicial to the object of the present invention in order to promote the formation of the complex phase stably and fully. (I) For example, a phosphoric acid metal salt (represented by the following formula (2) or (3) is added as an accelerator for forming stereo crystals.

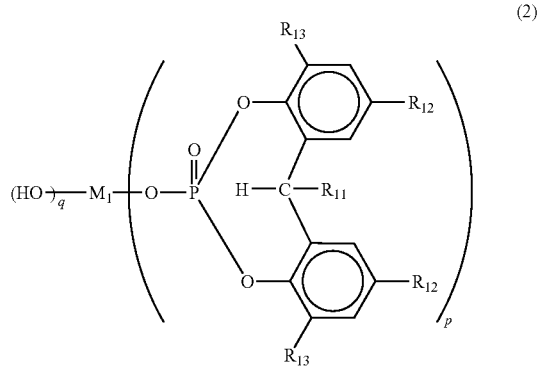

(2)

In the formula (2), $R_{11}$ is a hydrogen atom or alkyl group having 1 to 4 carbon atoms, $R_{12}$ and $R_{13}$ are each independently a hydrogen atom or alkyl group having 1 to 12 carbon atoms, $M_1$ is an alkali metal atom, alkali earth metal atom, zinc atom or aluminum atom, p is 1 or 2, and q is 0 when $M_1$ is an alkali metal atom, alkali earth metal atom or zinc atom and 1 or 2 when $M_1$ is an aluminum atom.

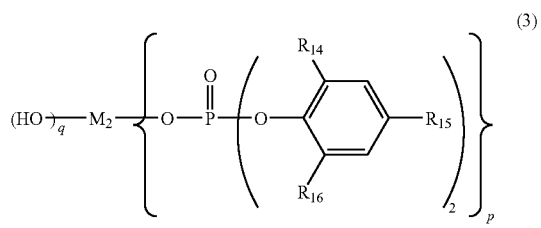

(3)

In the formula (3), $R_{14}$, $R_{15}$ and $R_{16}$ are each independently a hydrogen atom or alkyl group having 1 to 12 carbon atoms, $M_2$ is an alkali metal atom, alkali earth metal atom, zinc atom or aluminum atom, p is 1 or 2, and q is 0 when $M_2$ is an alkali metal atom, alkali earth metal atom or zinc atom and 1 to 2 when $M_2$ is an aluminum atom.

$M_1$ and $M_2$ of the phosphoric acid metal salt represented by the formula (2) or (3) are preferably Na, K, Al, Mg, Ca or Li, particularly preferably K, Na, Al or Li, most preferably Li or Al.

(II) A compound having at least one group selected from the group consisting of epoxy group, oxazoline group, oxazine group, isocyanate group, ketene group and carbodiimide group (may be referred to as "specific functional group" hereinafter) in the molecule is added as a block forming agent.

The content of the phosphoric acid metal salt is preferably 10 ppm to 2 wt %, more preferably 50 ppm to 0.5 wt %, much more preferably 100 ppm to 0.3 wt % based on the polylactic acid (component A). When the content is too low, the effect of improving the stereo crystal rate becomes small and when the content is too high, the resin itself is deteriorated disadvantageously.

Further, a crystallization nucleating agent may be optionally used to strengthen the function of the phosphoric acid metal salt in limits not prejudicial to the object of the present invention. The crystallization nucleating agent is preferably selected from calcium silicate, talc, kaolinite and montmorillonite. The content of the crystallization nucleating agent used to strengthen the function of the phosphoric acid metal salt is preferably 0.05 to 5 parts by weight, more preferably 0.06 to 2 parts by weight, much more preferably 0.06 to 1 part by weight based on 100 parts by weight of the polylactic acid (component A).

In the present invention, the specific functional group of the block forming agent reacts with the terminal of the molecule of the polylactic acid (component A) to connect some poly (L-lactic acid) units and some poly(D-lactic acid) units so as to form blocked polylactic acid, thereby promoting the formation of the stereocomplex phase. What are known as a carboxyl group capping agent for polyesters may be used as the block forming agent. Out of these, carbodiimide compounds are preferred from the viewpoint of their influence upon the colors, thermal decompositions and hydrolysis resistances of the polylactic acid and the resin composition of the present invention. The amount of the block forming agent is preferably 0.001 to 5 parts by weight, more preferably 0.01 to 3 parts by weight based on 100 parts by weight of the polylactic acid (component A). When the amount of the block forming agent exceeds the above range, the chances of the color deterioration or plasticization of the obtained resin become high disadvantageously. When the amount is smaller than 0.001 part by weight, the effect of the block forming agent is rarely seen and has little industrial value.

The additives (I) and (II) may be used alone, but a combination of these additives is preferred because the formation of the complex phase of the polylactic acid (component A) can be promoted more effectively.

The carboxyl group concentration of the polylactic acid (component A) is preferably 10 eq/ton or less, more preferably 2 eq/ton or less, much more preferably 1 eq/ton or less. When the carboxyl group concentration falls within this range, the physical properties such as melt stability and moist heat stability of the polylactic acid (component A) and the resin composition are excellent. To reduce the carboxyl group concentration of the polylactic acid (component A) to 10 eq/ton or less, a known method of reducing the carboxyl group concentration with a polyester composition may be advantageously employed. Stated more specifically, a terminal capping agent such as moist heat resistance improving agent is added, or esterification or amidation is carried out by means of an alcohol or amine without adding a terminal capping agent.

As the moist heat resistance improving agent may be used the above carboxyl group capping agent having a specific functional group. Especially, a carbodiimide compound having a carbodiimido group as the specific functional group can cap a carboxyl group effectively and is preferably selected from the viewpoints of the color, the promotion of the formation of the complex phase and moist heat resistance of the polylactic acid and the resin composition of the present invention.

In the present invention, the polylactic acid (component A) preferably contains a compound having a specific functional group which serves as a block forming agent and moist heat resistance improving agent. The compound is preferably a carbodiimide compound. The amount of the carbodiimide compound is preferably 0.001 to 5 parts by weight based on 100 parts by weight of the polylactic acid (component A). When the amount of the carbodiimide compound is smaller than 0.001 part by weight, the carbodiimide compound does not serve as a block forming agent and carboxyl group capping agent satisfactorily. When the amount exceeds the above range, the chances of the color deterioration or plasticization of the resin become high due to an undesired side-reaction such as the decomposition of the agent.

In the present invention, a carbodiimide compound is selected as the main component of the compound having a specific functional group and the other compound is preferably selected to complement or reinforce the function of the carbodiimide compound.

The following compounds are enumerated as examples of the compound having a specific functional group which can be used in the present invention. Examples of the carbodiimide compound include mono- and poly-carbodiimide compounds such as dicyclohexylcarbodiimide, diisopropylcarbodiimide, diisobutylcarbodiimide, dioctylcarbodiimide, octyldecylcarbodiimide, di-t-butylcarbodiimide, dibenzylcarbodiimide, diphenylcarbodiimide, N-octadecyl-N'-phenylcarbodiimide, N-benzyl-N'-phenylcarbodiimide, N-benzyl-N'-tolylcarbodiimide, di-o-toluoylcarbodiimide, d-p-toluoylcarbodiimide, bis(p-aminophenyl)carbodiimide, bis(p-chlorophenyl)carbodiimide, bis(o-chlorophenyl) carbodiimide, bis(o-ethylphenyl)carbodiimide, bis(p-ethylphenyl)carbodiimide, bis(o-isopropylphenyl)carbodiimide, bis(p-isopropylphenyl)carbodiimide, bis(o-isobutylphenyl)carbodiimide, bis(p-isobutylphenyl)carbodiimide, bis(2,5-dichlorophenyl)carbodiimide, bis(2,6-dimethylphenyl)carbodiimide, bis(2,6-diethylphenyl)carbodiimide, bis(2-ethyl-6-isopropylphenyl)carbodiimide, bis(2-butyl-6-isopropylphenyl)carbodiimide, bis(2,6-diisopropylphenyl)carbodiimide, bis(2,6-di-t-butylphenyl)carbodiimide, bis(2,4,6-trimethylphenyl)carbodiimide, bis(2,4,6-triisopropylphenyl)carbodiimide, bis(2,4,6-tributylphenyl)carbodiimide, diβnaphthylcarbodiimide, N-tolyl-N'-cyclohexylcarbodiimide, N-tolyl-N'-phenylcarbodiimide, p-phenylenebis(o-toluoylcarbodiimide), p-phenylenebis(cyclohexylcarbodiimide), p-phenylenebis(p-chlorophenylcarbodiimide), 2,6,2',6'-tetraisopropyldiphenylcarbodiimide, hexamethylenebis(cyclohexylcarbodiimide), ethlenebis(phenylcarbodiimide) and ethylenebis(cyclohexylcarbodiimide).

Out of these, bis(2,6-diisopropylphenyl)carbodiimide and 2,6,2',6'-tetraisopropyldiphenylcarbodiimide are preferred from the viewpoints of reactivity and stability.

Dicyclohexylcarbodiimide and bis(2,6-diisopropylphenyl)carbodiimide which are available industrially may be advantageously used.

Further, commercially available polycarbodiimide compounds may be advantageously used as the above polycarbodiimide compound because they do not need to be synthesized and include Carbodilite LA-1 and HMV-8CA which are marked by Nisshinbo Industries, Inc.

Glycidyl ether compounds, glycidyl ester compounds, glycidyl amine compounds, glycidyl imide compounds, glycidyl amide compounds and alicyclic epoxy compounds may be preferably used as the epoxy compound which can be used in the present invention. A polylactic acid composition and a molded article having excellent mechanical properties, moldability, heat resistance and durability can be obtained by blending the compound.

The above glycidyl ether compounds include stearyl glcyidyl ether, phenyl glycidyl ether, ethylene oxide lauryl alcohol glycidyl ether, ethylene glycol diglycidyl ether, polyethylene glycol diglycidyl ether, polypropylene glycol diglycidyl ether, neopentyl glycol diglycidyl ether, polytetramethylene glycol diglycidyl ether, glycerol triglycidyl ether, trimethylolpropane triglycidyl ether, pentaerythritol tetraglycidyl ether and bisphenol A diglycidyl ether type epoxy resins obtained by a condensation reaction between a bisphenol such as bis(4-hydroxyphenyl)methane and epichlorohydrin. Out of these, bisphenol A diglycidyl ether type epoxy resins are preferred.

The above glycidyl ester compounds include glycidyl benzoate, glycidyl stearate, glycidyl neodecanonate, diglycidyl terephthalate, diglycidyl phthalate, diglycidyl cyclohexanedicarboxylate, diglycidyl adipate, diglycidyl succinate, diglycidyl dodecadionate and tetraglycidyl pyromellitate. Out of these, glycidyl benzoate and glycidyl ester of versatic acid are preferred.

The above glycidyl amine compounds include tetraglycidylamine diphenylmethane, triglycidyl-p-aminophenol, diglycidyl aniline, diglycidyl toluidine, tetraglycidyl metaxylenediamine and triglycidyl isocyanurate.

The above glycidyl imide and glycidyl amide compounds include N-glycidylphthalimide, N-glycidyl-4,5-dimethylphthalimide, N-glycidyl-3,6-dimethylphthalimide, N-glycidylsuccinimide, N-glycidyl-1,2,3,4-tetrahydrophthalimide, N-glycidylmaleinimide, N-glycidylbenzamide and N-glycidylstearylamide. Out of these, N-glycidylphthalimide is preferred.

The above alicyclic epoxy compounds include 3,4-epoxycyclohexyl-3,4-cyclohexylcarboxylate, bis(3,4-epoxycyclohexylmethyl)adipate, vinylcyclohexenediepoxide, n-methyl-4,5-epoxycyclohexane-1,2-dicarboxylic acid imide and N-phenyl-4,5-epoxycylohexane-1,2-dicarboxylic acid imide.

The other epoxy compounds include epoxy modified fatty acid glycerides such as epoxylated soy oil, epoxylated linseed and epoxylated whale oil, phenol novolak type epoxy resin and cresol novolak type epoxy resin.

Examples of the oxazoline compound which can be used as a carboxy group capping agent in the present invention include 2-methoxy-2-oxazoline, 2-butoxy-2-oxazoline, 2-stearyloxy-2-oxazoline, 2-cyclohexyloxy-2-oxazoline 2-allyloxy-2-oxazoline, 2-benzyloxy-2-oxazoline, 2-p-phenylphenoxy-2-oxazoline, 2-methyl-2-oxazoline, 2-cyclohexyl-2-oazoline, 2-methallyl-2-oxazoline, 2-crotyl-2-oxazoline, 2-phenyl-2-oxazoline, 2-o-ethylphenyl-2-oxazoline, 2-o-propylphenyl-2-oxazoline, 2-p-phenylphenyl-2-oxazoline, 2,2'-bis(2-oxazoline), 2,2'-bis(4-methyl-2-oxazoline), 2,2'-bis(4-butyl-2-oxazoline), 2,2'-m-phenylenebis(2-oxazoline), 2,2'-p-phenylenebis(4-methyl-2-oxazoline), 2,2'-p-phenylenebis(4,4'-methyl-2-oxazoline), 2,2'-ethylenebis(2-oxazoline), 2,2'-tetramethylenebis(2-oxazoline), 2,2'-hexamethylenebis(2-oxazoline), 2,2'-ethylenebis(4-methyl-2-oxazoline), 2,2'-tetramethylenebis(4,4'-dimethyl-2-oxazoline), 2,2'-cyclohexylenebis(2-oxazoline) and 2,2'-diphenylenebis(4-methyl-2-oxazoline). Polyoxazoline compounds comprising the above compounds as a monomer unit are also included.

Examples of the oxazine compound which can be used in the present invention include 2-methoxy-5,6-dihydro-4H-1,3-oxazine, 2-hexyloxy-5,6-dihydro-4H-1,3-oxazine, 2-decyloxy-5,6-dihydro-4H-1,3-oxazine, 2-cyclohexyloxy-5,6-dihydro-4H-1,3-oxazine, 2-allyloxy-5,6-dihydro-4H-1,3-oxazine and 2-crotyloxy-5,6-dihydro-4H-1,3-oxazine.

Further, 2,2'-bis(5,6-dihydro-4H-1,3-oxazine), 2,2'-methylenebis(5,6-dihydro-4H-1,3-oxazine), 2,2'-ethylenebis(5,6-dihydro-4H-1,3-oxazine), 2,2'-hexamethylenebis(5,6-dihydro-4H-1,3-oxazine), 2,2'-p-phenylenebis(5,6-dihydro-4H-1,3-oxazine) and 2,2'-P,P'-diphenylenebis(5,6-dihydro-4H-1,3-oxazine) are also included. Further, polyoxazine compounds comprising the above compounds as a monomer unit may also be used.

Out of the above oxazoline compounds and oxazine compounds, 2,2'-m-phenylenebis(2-oxazoline) and 2,2'-p-phenylenebis(2-oxazoline) are preferred.

The isocyanate compound which can be used in the present invention is an aromatic, aliphatic or alicyclic isocyanate compound or a mixture thereof.

Examples of the monoisocyanate compound include phenyl isocyanate, tolyl isocyanate, dimethylphenyl isocyanate, cyclohexyl isocyanate, butyl isocyanate and naphthyl isocyanate.

Examples of the diisocyanate include 4,4'-diphenylmethane diisocyanate, 4,4'-diphenyldimethylmethane diisocyanate, 1,3-phenylenediisocyante, 1,4-phenylenediisocyanate, 2,4-tolylenediisocyanate, 2,6-tolylenediisocyanate, mixture of 2,4-tolylenediisocyanate and 2,6-tolylenediisocyanate, cyclohexane-4,4'-diisocyanate, xylylene diisocyanate, isophorone diisocyanate, dicyclohexylmethane-4,4'-diisocyanate, methylcyclohexane diisocyanate, tetramethylxylylene diisocyanate and 2,6-diisopropylphenyl-1,4-diisocyanate.

Out of these isocyanate compounds, aromatic isocyanates such as 4,4'-diphenylmethane diisocyanate and phenyl isocyanate are preferred.

The ketene compound which can be used in the present invention is an aromatic, aliphatic or alicyclic ketene compound or a mixture thereof. More specifically, the ketene compound include diphenyl ketene, bis(2,6-di-t-butylphenyl) ketene, bis(2,6-di-isopropylphenyl) ketene and dicyclohexyl ketene. Out of these ketene compounds, aromatic ketene such as diphenyl ketene, bis(2,6-di-t-butylphenyl)ketene and bis(2,6-di-isopropylphenyl)ketene are preferred.

The above block forming agents and the moist heat resistance improving agents may be used alone or in combination of two or more. As one of the preferred embodiments, the formation of a block structure is promoted and the terminal of the carboxyl group or part of an acidic low molecular weight compound is capped by the moist heat resistance improving agent advantageously.

The lactide content of the polylactic acid (component A) is preferably 0 to 1,000 ppm, more preferably 0 to 500 ppm, much more preferably 0 to 200 ppm, particularly preferably 0 to 100 ppm. When the lactide content falls within the above range, the generation of a substance for causing the contamination of film forming equipment and a defect on the surface of the film can be suppressed.

The lactide content can be reduced to the above range by carrying out conventionally known lactide reduction methods alone or in combination in any stage from the polymerization of poly(L-lactic acid) and poly(D-lactic acid) till the end of the manufacture of the polylactic acid (component A).

<Acrylic Resin: Component B>

The acrylic resin (component B) is obtained by polymerizing at least one monomer selected from methacrylates such as cyclohexyl methacrylate, t-butylcyclohexyl methacrylate and methyl methacrylate and acrylates such as methyl acrylate, ethyl acrylate, butyl acrylate, isopropyl acrylate and 2-ethylhexyl acrylate. These monomers may be used alone or in combination of two or more. Out of these, a homopolymer of methyl methacrylate or a copolymer of methyl methacrylate and another monomer is preferred.

Examples of the monomer which is copolymerizable with methyl methacrylate include alkyl methacrylates, alkyl acrylates, aromatic vinyl compounds such as styrene, vinyl toluene and α-methylstyrene, vinyl cyanides such as acrylonitrile and methacrylonitrile, maleimides such as N-phenylmaleimide and N-cyclohexylmaleimide, unsaturated carboxylic anhydrides such as maleic anhydride, and unsaturated acids such as acrylic acid, methacrylic acid and maleic acid. Out of these monomers copolymerizable with methyl methacrylate, alkyl acrylates have excellent heat decomposition resistance. Methacrylic resin obtained by copolymerizing an alkyl acrylate has high flowability at the time of molding.

The amount of the alkyl acrylate when the alkyl acrylate is copolymerized with methyl methacrylate is preferably 0.1 wt % or more from the viewpoint of heat decomposition resistance and 15 wt % or less from the viewpoint of heat resistance. The amount of the alkyl acrylate is more preferably 0.2 wt % or more and 14 wt % or less, particularly preferably 1 wt % or more and 12 wt % or less.

Out of these alkyl acrylates, methyl acrylate and ethyl acrylate are most preferred because the above improving effect is marked even when a small amount of it is copolymerized with methyl methacrylate. The above monomers copolymerizable with methyl methacrylate may be used alone or in combination of two or more.

The weight average molecular weight of the acrylic resin (component B) is preferably 50,000 to 200,000. The weight average molecular weight is preferably 50,000 or more from the viewpoint of the strength of a molded article and 200,000 or less from the viewpoints of moldability and flowability. It is more preferably 70,000 to 150,000. In the present invention, an isotactic polymethacrylate and a syndiotactic polymethacrylate may be used at the same time.

To manufacture the acrylic resin, a commonly used polymerization method such as cast polymerization, bulk polymerization, suspension polymerization, solution polymerization, emulsion polymerization or anion polymerization may be employed. For optical use, it is preferred to avoid the inclusion of fine foreign matter as much as possible. From this point of view, bulk polymerization and solution polymerization in which a suspension agent or an emulsifier is not used are preferred. When solution polymerization is carried out, a solution prepared by dissolving a mixture of monomers in an aromatic hydrocarbon solvent such as toluene, ethylbenzene or xylene may be used. When bulk polymerization is carried out, polymerization can be initiated by the application of a free radical formed by heating or ionizing radiation as usually carried out.

Any initiator which is generally used for radical polymerization may be used as the initiator used for the polymerization reaction. Examples of the initiator include azo compounds such as azobisisobutyronitrile, and organic peroxides such as benzoyl peroxide, lauroyl peroxide and t-butylperoxy-2-ethylhexanoate. Since solution polymerization is commonly used when polymerization is carried out at a high temperature of 90° C. or higher, a peroxide or azobis initiator which is soluble in an organic solvent and whose 10-hour half-life period temperature is 80° C. or higher is preferred. Examples of the initiator include 1,1-bis(t-butylperoxy)3,3,5-trimethylcyclohexane, cyclohexane peroxide, 2,5-dimethyl-2,5-di(benzoylperoxy)hexane, 1,1-azobis(1-cyclohexanecarbonitrile) and 2-(carbamoylazo)isobutyronitrile. The initiator is used in an amount of 0.005 to 5 wt %.

Any molecular weight control agent which is used for general radical polymerization is used as the molecular weight control agent which is used for the polymerization reaction as required. For example, mercaptan compounds such as butyl mercaptan, octyl mercaptan, dodecyl mercaptan and 2-ethylhexyl thioglycolate are particularly preferred as the molecular weight control agent. The molecular weight control agent is added in an amount that ensures that the degree of polymerization is controlled to the above range.

<Resin Composition>

In the resin composition, the weight ratio of the polylactic acid (component A) to the acrylic resin (component B) can be set to 90/10 to 30/70 but preferably 90/10 to 50/50, more preferably 80/20 to 50/50, much more preferably 70/30 to 50/50.

Preferably, the resin composition has a stereo crystal rate of 80% or more when measured by DSC. When the stereo crystal rate is 80% or more, the heat shrinkage factor at 90° C. of the film can be reduced. The stereo crystal rate of the resin composition is more preferably 90% or more, much more preferably 95% or more, particularly preferably 100%.

When a hydrolysis inhibitor is added to the resin composition, a reduction in molecular weight caused by the hydrolysis of the polylactic acid (component A) can be suppressed, thereby making it possible to suppress, for example, a reduction in strength. A compound having reactivity with carboxylic acid and hydroxyl group which are the terminal functional groups of the polylactic acid, for example, the above-described compound having a specific functional group, especially a carbodiimide compound is preferably used as the hydrolysis inhibitor.

The carbodiimide compound is preferably contained in an amount of 0.001 to 5 wt % based on the total amount of the polylactic acid (component A) and the acrylic resin (component B). When the amount of the carbodiimide compound falls within the above range, the stability to water and hydrolytic stability of the resin composition can be advantageously enhanced.

From this point of view, the content of the carbodiimide compound is more preferably 0.01 to 5 wt %, much more preferably 0.1 to 4 wt %. When the content of the carbodiimide compound falls below the above range, the effect obtained by adding the carbodiimide compound is not observed effectively. When the content of the carbodiimide compound exceeds the above range, the further improvement of hydrolytic stability is not expected and an unpreferred phenomenon such as the deterioration of the color of the resin composition may occur.

The total content of L- and D-lactides in the resin composition is preferably 0 to 1,000 ppm, more preferably 0 to 200 ppm, much more preferably 0 to 100 ppm based on the total amount of the polylactic acid (component A) and the acrylic resin (component B). It is preferred from the viewpoint of the physical properties such as color and stability of the resin composition that the total content of lactides should be low. However, when the operation of reducing the total content is performed excessively, the further improvement of the physical properties is not expected and an undesired case may occur from the viewpoint of cost.

The carboxyl group concentration of the resin composition is preferably 0 to 30 equivalents/ton, more preferably 0 to 10 equivalents/ton, much more preferably 0 to 5 equivalents/ton, particularly preferably 0 to 1 equivalent/ton based on the total amount of the polylactic acid (component A) and the acrylic resin (component B). Although the carboxyl group concentration can be easily reduced by using polylactic acid (component A) whose carboxyl group concentration has been reduced, it can also be reduced by adding the above-described carbodiimide compound or an agent having a specific functional group.

The resin composition may comprise another polymer excluding the polylactic acid (component A) and the acrylic resin (component B) in limits not prejudicial to the object of the present invention. Examples of the other polymers include polyolefins such as polyethylene and polypropylene, styrene-based resins such as polystyrene and styrene acrylonitrile copolymer, thermoplastic resins such as polyamides, polyphenylene sulfide resin, polyether ether ketone resin, polyesters, polysulfones, polyphenylene oxide, polyimides, polyether imides and polyacetals, and thermosetting resins such as phenolic resin, melamine resin, silicone resin and epoxy resin. At least one of them may be contained.

Any additives may be mixed with the resin composition according to purpose as long as they do not greatly impair the effect of the present invention. The types of the additives are not particularly limited if they are commonly mixed with resins and rubber-like polymers. The additives include inorganic fillers and pigments such as iron oxide. They also include lubricants such as stearic acid, behenic acid, zinc stearate, calcium stearate, magnesium stearate and ethylene bisstearamide, and release agents. Softeners and plasticizers such as paraffin-based process oils, naphthene-based process oils, aromatic process oils, paraffins, organic polysiloxanes and mineral oils are further included. Antioxidants such as hindered phenol-based antioxidants and phosphorus-based heat stabilizers, hindered amine-based optical stabilizers, benzotriazole-based ultraviolet absorbers, flame retardants and antistatic agents are further included. Reinforcing agents such as organic fibers, glass fibers, carbon fibers and metal whiskers, colorants and electrostatic adhesion accelerators are also included. Mixtures thereof may also be used.

The resin composition can be manufactured by a known method. For example, the resin composition can be manufactured by adding and melt kneading together the polylactic acid (component A) and the acrylic resin (component B) and optionally the above-described other components such as hydrolysis inhibitor by means of a melt kneader such as single-screw extruder, double-screw extruder, Banbury mixer, brabender or other kneader.

<Manufacture of Film>

To form the obtained resin composition into a film, a molding technique such as extrusion molding or cast molding may be used. For example, an extruder equipped with a T die or circular die is used to form the resin composition into a film.

To obtain an unstretched film by extrusion molding, a material obtained by melt kneading together the polylactic acid (component A) and the acrylic resin (component B) may be used, or melt kneading may be carried out at the time of extrusion molding. The unstretched film can be manufactured by extruding the molten film onto a cooling drum and bringing the film into close contact with a rotating cooling drum to cool it. At this point, an electrostatic adherence agent such as quaternary phosphonium sulfonate is applied to the molten film to facilitate the application of charge to the molten surface of the film from an electrode without contact, thereby bringing the film into close contact with the rotating cooling drum. Thereby, an unstretched film having few surface defects can be obtained.

Alternatively, the unstretched film may be cast molded by dissolving the polylactic acid (component A) and the acrylic resin (component B) in a common solvent for the polylactic acid (component A) and the acrylic resin (component B), for example, chloroform or methylene dichloride and cast drying the obtained solution to solidify it.

(Stretching)

The unstretched film can be monoaxially stretched in a mechanical flow direction (MD) and monoaxially stretched in a direction (TD) orthogonal to the mechanical flow direction. A biaxially oriented film can be manufactured by stretching the unstretched film by sequential biaxial stretching using a roll and a tenter, simultaneous biaxial stretching using a tenter, or tubular biaxial stretching.

The draw ratio is preferably 0.1% or more and 1,000% or less, preferably 0.2% or more and 600% or less, much more preferably 0.3% or more and 300% or less in at least one direction. When the draw ratio falls within this range, a stretched film which is preferred in terms of birefringence, heat resistance and strength is obtained.

The draw ratio is preferably 1 to 15, more preferably 1.01 to 10, much more preferably 1.1 to 5, particularly preferably 1.1 to 3 in terms of area draw ratio (longitudinal draw ratio× transverse draw ratio).

When a heat treatment is carried out to achieve a film crystallinity of 10% or more, the longitudinal draw ratio or transverse draw ratio must be more than 1, that is, the film must be stretched. The transparency of the unstretched film (draw ratio of 1 or less) may be reduced by the evaluation of heat resistance described in "Optical Films for Electronics" (2006) edited by the Society for the Study of Electric and Electronic Materials and the evaluation of heat resistance of the present invention which is an advanced version of the above evaluation (5 hours of heat treatment at 90° C.), which is fatal for an optical film.

The stretching temperature is preferably selected from a range from the glass transition temperature (Tg) to the crystallization temperature (Tc) of the resin composition. Further, to suppress Re and Rth, a temperature range which is higher than Tg and as close to Tc as possible but at which the crystallization of the polylactic acid (component A) does not proceed is more preferably used.

Since the molecular chain is fixed at a temperature lower than Tg, it is difficult to carry out the stretching operation advantageously and to reduce Re and Rth to 20 nm or less. At Tc or higher, the crystallization of the polylactic acid (component A) proceeds and it is difficult to carry out the stretching operation advantageously as well.

Therefore, the stretching temperature is preferably selected from a temperature range from Tg to Tc at which the crystallization of the polylactic acid rarely proceeds, for example, Tg to the crystallization temperature (Tc) in order to achieve optical isotropy for the film of the present invention.

In the present invention, the stretching temperature is preferably (Tg+5)° C. to Tc° C., more preferably (Tg+10)° C. to Tc° C., much more preferably (Tg+20)° C. to Tc° C. to obtain both the excellent physical properties of the film and the stabilization of the stretching step. Since the excellent physical properties of the film and the stabilization of the stretching step conflict each other, the upper limit value of the stretching temperature should be suitably set in consideration of the characteristic properties of the apparatus.

(Heat Treatment)

The stretched film is preferably heated at a temperature range from the crystallization temperature (Tc) of the resin composition to the crystal melting start temperature (Tm*) of the complex-phase polylactic acid. This heat treatment promotes the crystallization of the complex-phase polylactic acid, suitably reduces the heat shrinkage factor and enables the storage elastic modulus E' to be kept at a value larger than $0.5 \times 10^8$ Pa without taking a minimum value at a temperature range from normal temperature (25° C.) to 150° C. in the measurement of dynamic viscoelasticity (DMA).

Since the crystallization temperature Tc of the obtained composition shifts toward a high temperature side when the acrylic resin which is amorphous is blended with the polylactic acid which is crystalline resin, in the case of homopolylactic acid whose melting point is close to the crystallization temperature Tc, the fusion of the stretched film starts at the crystallization temperature, thereby making it difficult to crystallize the stretched film. However, even when the stereocomplex polylactic acid whose melting point is higher than the crystallization temperature is blended with the acrylic resin, the obtained composition can be heated at a high temperature, thereby making it possible to crystallize the stretched film.

The crystallization temperature (Tc) and the crystal melting start temperature (Tm*) of the complex-phase polylactic acid change according to the ratio of the polylactic acid (component A) to the acrylic resin (component B).

The heat treatment temperature is preferably 90 to Tm* (° C.), more preferably 150 to (Tm*−10)(° C.), much more preferably 160 to (Tm*−20)(° C.).

The heat treatment is preferably carried out for 1 second to 30 minutes. When the heat treatment temperature is high, the heat treatment is carried out for a relatively short time and when the heat setting temperature is low, the heat treatment is carried out for a relatively long time. For example, in a case of a film having a Tc of 140° C., the heat shrinkage factor of the film can be set to less than 5% by heating it at 140° C. for at least 30 seconds, at 150° C. for 10 seconds and at 90° C. for 5 hours.

The film obtained as described above can be optionally subjected to a surface activation treatment such as plasma treatment, amine treatment or corona treatment in accordance with a conventionally known method.

<Characteristic Properties of Film>

(Thickness)

The thickness of the film of the present invention is preferably 1 to 300 μm, more preferably 10 μm or more, much more preferably 20 to 150 μm. It is particularly preferably 10 μm or more from the viewpoint of creasing ease (prevention of creasing) at the time of handling. It is 200 μm or less from the viewpoint of transparency.

(Photoelastic Coefficient)

The absolute value of photoelastic coefficient of the film of the present invention is preferably less than $10 \times 10^{-12}$/Pa, more preferably less than $8 \times 10^{-12}$/Pa, much more preferably less than $5 \times 10^{-12}$/Pa, particularly preferably less than $3 \times 10^{-12}$/Pa.

There is a description of the photoelastic coefficient (CR) in various documents (refer, for example, to the non-patent document 1), and it is a value defined by the following equation. As the value of photoelastic coefficient becomes closer to nil, a change in birefringence caused by external force is smaller and a change in birefringence designed for each purpose is smaller.

$$CR = \Delta n / \sigma R$$

$$\Delta n = nx - ny$$

CR represents a photoelastic coefficient, σR an elongation stress, Δn a refractive index difference, nx a refractive index in the elongation direction, and ny a refractive index in a direction orthogonal to the elongation direction.

(Phase Difference in Plane Direction (Re) and Phase Difference in Thickness Direction (Rth))

The phase difference (Re) in the plane direction of the film of the present invention and the phase difference (Rth) in the thickness direction of the film are the product of a birefringence difference Δn and a thickness d (nm), and Re and Rth are defined by the following equations (ii) and (iii), respectively.

$$Re = (nx - ny) \times d \qquad \text{(ii)}$$

$$Rth = ((nx + ny)/2 - nz) \times d \qquad \text{(iii)}$$

nx represents a refractive index in the longitudinal direction and ny a refractive index in the transverse direction. nz represents a refractive index in the thickness direction. d represents a thickness (nm).

Re and Rth of the film of the present invention are both preferably 10 nm or less, more preferably 5 nm or less, much more preferably 4 nm or less. A material having Re and Rth values within the above range is preferred because it hardly experiences phase difference nonuniformity caused by molding initiating orientation in extrusion molding or cast molding.

(Stereo Crystal Rate: S)

The film of the present invention has the crystal melting peak of the complex-phase polylactic acid at 190° C. or higher when measured by DSC.

Further, the film of the present invention has a stereo crystal rate (S) defined by the following equation (i) and obtained from crystal melting peak intensity when measured by DSC of preferably 80% or more, more preferably 90 to 100%, much more preferably 97 to 100%, particularly preferably 100%. That is, preferably, a stereocomplex phase is fully formed in the film of the present invention.

$$S(\%)=[\Delta Hms/(\Delta Hmh+\Delta Hms)]\times 100 \tag{i}$$

$\Delta Hms$ represents the crystal melting enthalpy (J/g) of the stereocomplex-phase polylactic acid. $\Delta Hmh$ represents the crystal melting enthalpy (J/g) of the homo-phase polylactic acid. The stereo crystal rate (S) is a parameter indicative of the proportion of the stereocomplex polylactic acid crystal formed in the end in the heat treatment step.

In the present invention, the crystal melting peak which appears at 190° C. or higher in DSC measurement is a crystal melting peak attributed to the melting of the stereocomplex-phase polylactic acid, and the crystal melting peak which appears at a temperature lower than 190° C. is a crystal melting peak attributed to the melting of the homo-phase polylactic acid.

(Shrinkage Factor)

The shrinkage factor in the longitudinal direction (MD) and shrinkage factor in the transverse direction (TD) of the film of the present invention when it is treated at 90° C. for 5 hours are both preferably 5% or less, more preferably 4% or less.

(Storage Elastic Modulus: E')

Preferably, the storage elastic modulus (E') in the measurement of dynamic viscoelasticity of the film of the present invention does not take a minimum value at a temperature range from normal temperature (25° C.) to 150° C. and has a value larger than $0.5\times 10^8$ Pa.

Since the film of the present invention does not show the minimum value of E' even when it is heated at about 150° C. which is required in the manufacturing process of a polarizing film, it has high dimensional stability. Since E' is larger than $0.5\times 10^8$ Pa, the film is hardly deformed by external force, rarely experiences fluctuations in the phase difference and further exhibits high workability in the manufacturing process of a polarizing film.

(Stereo Crystallinity: K)

The stereo crystallinity (K) defined by the following equation (iv) of the film of the present invention is preferably 10 to 60%, more preferably 25 to 60%, much more preferably 30 to 55%, particularly preferably 35 to 55%.

$$K=(\Delta Hms-\Delta Hc)/142 \tag{iv}$$

$\Delta Hms$ represents the crystal melting enthalpy (J/g) of the stereocomplex-phase polylactic acid. $\Delta Hc$ represents the crystallization enthalpy (J/g) of polylactic acid. 142 (J/g) represents the equilibrium melting enthalpy of the stereocomplex-phase polylactic acid crystal.

<Polarizing Plate Protective Film>

The film of the present invention is useful as a polarizing plate protective film. The polarizing plate protective film is a film which is used as a constituent member of a polarizing plate and put on both sides or one side of the polarizing film (obtained, for example, by impregnating or adsorbing a dichroic pigment or dichroic dye such as polyiodine to a PVA base film having a high degree of polymerization) to improve the strength of the polarizing film, protect it from heat and water and prevent the deterioration of the film.

The polarizing plate protective film which is the film of the present invention may be used as a constituent member of a polarizing plate in a display such as liquid crystal display, plasma display, organic EL display, field emission display or rear projection TV. The polarizing plate protective film which is the film of the present invention may be optionally subjected to a surface functioning treatment such as antireflection treatment, transparent conductive treatment, electromagnetic shielding treatment, gas barrier treatment or antifouling treatment.

<Phase Difference Film>

The film of the present invention is useful as a phase difference film. The phase difference film which is the film of the present invention can control a phase difference produced by changing the blending ratio of the stereocomplex polylactic acid to the acrylic resin. When the amount of the stereocomplex polylactic acid is larger than 50 wt % and the amount of the acrylic resin is smaller than 50 wt %, strong birefringence can be obtained in the longitudinal direction and when the amount of the stereocomplex polylactic acid is smaller than 50 wt % and the amount of the acrylic resin is larger than 50 wt %, strong birefringence is obtained in the transverse direction. Further, the blending ratio can be changed to a suitable value by a required phase difference and the phase difference can be controlled by further stretching the film, whereby the film of the present invention can be advantageously used as a phase difference plate for liquid crystal display panels.

EXAMPLES

The following examples are provided for the purpose of further illustrating the present invention but are in no way to be taken as limiting. (I) Evaluation methods and (II) raw materials are described below.

(I) Evaluation Methods

The evaluation methods used in the present invention and Examples are described below.

(1) Molecular Weight:

The weight average molecular weight (Mw) and number average molecular weight (Mn) of a polymer were measured by gel permeation chromatography (GPC) and calculated in terms of standard polystyrene.

The following GPC measurement instrument was used.
Detector; RID-6A difference refractometer of Shimadzu Corporation
Column: TSKgelG3000HXL, TSKgelG4000HXL, TSKgelG5000HXL and TSKguardcokumnHXL-L of Tosoh Corporation were connected in series, or TSKgelG2000HXL, TSKgelG3000HXL and TSKguardcokumnHXL-L of Tosoh Corporation were connected in series.

10 μl of a sample having a concentration of chloroform as an eluent (chloroform containing 1% of hexafluoroisopropanol) of 1 mg/ml was injected and measured at 40° C. and a flow rate of 1.0 ml/min.

(2) Lactide Content

The sample was dissolved in hexafluoroisopropanol to determine the lactide content by $^{13}$C-NMR.

(3) Content of Carbodiimide Compound

The content of the carbodiimide compound was measured from comparison between the characteristic absorption of the resin and the characteristic absorption of the carbodiimide by the MAGJA-750 Fourier transformation infrared spectrophotometer of Nikore Co., Ltd.

(4) Carboxyl Group Concentration

The sample was dissolved in purified o-cresol in a nitrogen gas stream and titrated with an ethanol solution of 0.05 N potassium hydroxide using bromocresol blue as an indicator.

(5) Stereo Crystal Rate (S), Crystal Melting Temperature:

In the present invention, the stereo crystal rate (S) and the crystal melting temperature of the stereocomplex polylactic acid were obtained from the crystal melting enthalpy by measuring the crystal melting temperature and the crystal melting enthalpy with DSC (TA-2920 of TA Instrument Inc.) based on the following equation (i).

$$S(\%)=[\Delta Hms/(\Delta Hmh+\Delta Hms)]\times 100 \qquad (i)$$

$\Delta Hms$ represents the crystal melting enthalpy of the stereocomplex-phase polylactic acid, and $\Delta Hmh$ represents the crystal melting enthalpy of the homo-phase polylactic acid.

(6) Heat Shrinkage Factor of Film:

The heat shrinkage factor of the film was obtained from a change in the length of the film in accordance with ASTM D1204 after it was heated at 90° C. for 5 hours and returned to room temperature (25° C.), and further the haze value was obtained.

(7) Photoelastic Coefficient:

The birefringence measurement instrument described in detail in Polymer Engineering and Science, 1999, 39, 2349-2357 was used. The birefringence of the film was measured while elongation stress was applied at 23° C. by installing a film tensile device in the path of a laser beam. The distortion rate at the time of elongation was 50%/min (chuck interval: 10 mm, chuck moving speed: 5 mm/min) and the width of the sample was 8 mm. The photoelastic coefficient (CR) was calculated by obtaining the inclination of a straight line from the relationship between birefringence difference ($\Delta n$) and elongation stress ($\sigma R$) by least squares approximation.

$$CR=\Delta n/\sigma R$$

$$\Delta n=nx-ny$$

(CR: photoelastic coefficient, $\sigma R$: elongation stress, $\Delta n$: birefringence difference, nx: refractive index in elongation direction, ny: refractive index in a direction orthogonal to elongation direction)

(8) Total Light Transmittance

This was measured in accordance with ASTM D1003.

(9) Durability of Polarizing Plate

The durability of the film was evaluated based on the following criteria after it was heated at 90° C. for 5 hours and then returned to room temperature (25° C.)
○: it is not broken even when it is bent 10 times
Δ: it is not broken even when it is bent 2 times
X: it is broken by bending

(10) Measurement of Haze

The haze of a film having a thickness of 40 μm was measured by using the Hazemeter MDH2000 of Nippon Denshoku Co. Ltd. in accordance with 6.4 of JIS K7105-1981.

When the haze is higher than 1.6%, it is judged that transparency is unsatisfactory and when the haze is 0 to 1.6%, it is judged that the film is usable. When the haze is 1% or less, it is judged that the film is transparent enough to be used as an optical film.

(11) Method of Measuring Stereo Crystallinity (K)

The crystal melting enthalpy was measured by DSC (TA-2920 of TA Instrument Inc.).

$$K=(\Delta Hms-\Delta Hc)/142 \qquad (iv)$$

$\Delta Hms$: crystal melting enthalpy (J/g) of stereocomplex-phase polylactic acid
$\Delta Hc$: crystallization enthalpy (J/g) of polylactic acid 142 (J/g) is the equilibrium melting enthalpy of the stereocomplex polylactic acid crystal.

(12) Method of Measuring Glass Transition Temperature

This was obtained by using DSC (TA-2920 of TA Instrument Inc.).

(13) In-Plane Phase Difference (Re), Phase Difference in Thickness Direction (Rth)

The refractive index in the longitudinal direction (nx) and the refractive index in the transverse direction (ny) were measured by a spectral ellipsometer (M-150 of Nippon Bunko Co., Ltd.).

The phase difference in the plane direction of the film (Re) and the phase difference in the thickness direction of the film (Rth) were obtained from the refractive index in the longitudinal direction (nx), the refractive index in the transverse direction (ny) and the thickness (d: nm) based on the following equations (ii) and (iii), respectively.

$$Re=(nx-ny)\times d \qquad (ii)$$

$$Rth=((nx+ny)/2-nz)\times d \qquad (iii)$$

(14) Measurement of Dynamic Viscoelasticity (DMA)

A sample (strip-like, film width of 4 mm, chuck interval of 20 mm) was used to measure its dynamic viscoelasticity by using the following apparatus.
Measurement apparatus: RSA-III of TA Instrument Inc.
Measurement mode: automatic tension, automatic distortion control method
Measurement temperature range: 20 to 200° C.
Temperature elevation rate: 3° C./min
Measurement frequency: 1 Hz
DMA physical properties (existence or absence of minimum value)
absence: no minimum value appears at a temperature range from room temperature (25° C.) to 150° C.
existence: minimum value appears at a temperature range from room temperature (25° C.) to 150° C.

(15) Evaluation of Film Form Stability

After a 50 cm×50 cm film was left on a stainless steel plate heated at 100° C. for 30 minutes, its surface unevenness was judged.
X: 1 mm or more unevenness is produced and undulating surface is apparently seen
Δ: 0.2 or more and less than 1 mm unevenness is produced and undulating surface is seen visually
○: less than 0.2 mm unevenness is produced and surface can be judged as almost flat visually (II) Raw Materials Used in Examples 1 to 12 and Comparative Examples 1 to 4

The polylactic acid (component A) and the acrylic resin (component B) were prepared in the method of Production Examples 1 to 3.

Production Example 1-1

Manufacture of Poly(L-Lactic Acid) (PLLA1)

0.005 part by weight of tin octylate was added to 100 parts by weight of L-lactide (manufactured by Musashino Kagaku Kenkyusho Co., Ltd., optical purity of 100%) and reacted with the L-lactide in a nitrogen atmosphere by a reactor having a stirring blade at 180° C. for 2 hours, phosphoric acid was added to the tin octylate in an equivalent ratio of 1.2:1, the residual lactide was removed under a reduced pressure of 13.3 Pa, and the obtained product was formed into a chip to obtain poly(L-lactic acid) (PLLA1).

The obtained L-lactic acid (PLLA1) had a weight average molecular weight of 152,000, a glass transition point (Tg) of 55° C., a melting point of 175° C., a carboxyl group content of 14 eq/ton and a lactide content of 350 ppm.

Production Examples 1-2

Manufacture of Poly(D-Lactic Acid) (PDLA1)

Polymerization was carried out under the same conditions except that the L-lactide of Production Example 1-1 was changed to D-lactide (manufactured by Musashino Kagaku Kenkyusho Co., Ltd., optical purity of 100%) to obtain poly (D-lactic acid) (PDLA1).

The obtained poly(D-lactic acid) (PDLA1) had a weight average molecular weight of 151,000, a glass transition point (Tg) of 55° C., a melting point of 175° C., a carboxyl group content of 15 eq/ton and a lactide content of 450 ppm. The results are shown in table 1.

TABLE 1

| Characteristic properties | | Production Example 1-1 PLLA1 | Production Example 1-2 PDLA1 |
|---|---|---|---|
| Tm | (° C.) | 175 | 175 |
| Tg | (° C.) | 55 | 55 |
| Mw | (×10$^4$) | 15.2 | 15.1 |
| Carboxyl group concentration | (eq/ton) | 14 | 15 |
| Lactide content | (ppm) | 350 | 450 |

Production Examples 2-1 to 2-3

Manufacture of Polylactic Acids (A1 to A3)

50 parts by weight of the poly(L-lactic acid) and 50 parts by weight of the poly(D-lactic acid) obtained in Production Example 1-1 and 0.3 part by weight of a phosphoric acid metal salt (Adekastab NA-71 of ADEKA Co., Ltd.) were fed from the first feed port of a double-screw kneader to be melt kneaded together at a cylinder temperature of 230° C. Further, 1 part by weight of the Carbodilite LA-1 of Nisshinbo Industries, Inc. was fed from the second feed port based on 100 parts by weight of the total of the poly(L-lactic acid) and the poly(D-lactic acid) and melt kneaded while air was evacuated at a vent pressure of 13.3 Pa. Thereafter, a strand was ejected into a water tank and formed into a chip with a chip cutter to obtain polylactic acids A1 to A3. The weight average molecular weights (Mw), carboxyl group concentrations, lactide contents, stereo crystal rates (S), stereo crystallinities, glass transition temperatures (Tg) and crystal melting temperatures of the obtained polylactic acids A1 to A3 are shown in Table 2.

Acrylic Resin (Component B):

The Acrypet VH001 of Mitsubishi Rayon Co., Ltd. was used and represented by B1.

Examples 1 to 5

The polylactic acid (component A) and the acrylic resin (component B1) obtained in Production Example 2 were mixed together in a weight ratio shown in Table 3, and 0.5 part by weight of tetrabutylphosphonium 3,5-dicarboxybenzene-sulfonate based on 100 parts by weight of the total of the polylactic acid (component A) and the acrylic resin (component B1) was mixed with the resulting mixture by means of a Henschel mixer. Thereafter, the resulting mixture was dried at 110° C. for 5 hours and melt kneaded by a double-screw extruder at a cylinder temperature of 230° C. to be melt extruded into a 210 μm-wide film at a die temperature of 220° C., and the film was brought into close contact with the surface of a mirror-surface cooling drum by electrostatic casting using a platinum coated linear electrode to be solidified so as to obtain an unstretched film.

The obtained unstretched film was stretched to 1.1 to 1.5 times in the longitudinal direction and to 1.1 to 2.0 times in the transverse direction at 100° C. Then, the film was heat set at 140 to 160° C. to obtain a biaxially oriented film having a thickness of about 40 μm. The resin composition, the production conditions of the film and the physical properties of the film are shown in Table 3.

Comparative Examples 1 to 4

A mixture of the polylactic acid component and the acrylic resin of the types shown in Table 3 in a weight ratio shown in Table 3 or one of them was extruded, stretched and formed into a film in the same manner as in Example 1. The heat treatment temperature was 120 to 150° C. The results are shown in Table 4.

TABLE 2

| | | Production Example 2-1 | Production Example 2-2 | Production Example 2-3 |
|---|---|---|---|---|
| Polylactic acid (component A) | Name | A1 | A2 | A3 |
| Poly(L-lactic acid) | Type | PLLA1 | PLLA1 | PLLA1 |
| Poly(D-lactic acid) | Type | PDLA1 | PDLA1 | PDLA1 |
| Phosphoric ester metal salt | Type | — | NA-71 | NA-71 |
| Carbodiimide | Type | LA-1 | — | LA-1 |
| Physical properties | | | | |
| Weight average molecular weight (Mw) | (×10$^4$) | 14.9 | 14.1 | 14.9 |
| Lactide content | (ppm) | 62 | 60 | 61 |
| Carboxyl group concentration | (eq/ton) | 1 | 15 | 1 |
| Stereo crystal rate (S) | (%) | 80 | 97 | 100 |
| Stereo crystallinity (K) | (%) | 35 | 55 | 57 |
| Glass transition temperature (Tg) | (° C.) | 59 | 60 | 60 |
| Crystal melting temperature | (° C.) | 165/221 | 165/220 | 221 |

Phosphoric ester metal salt: NA-71 (Adekastab NA-71)
Carbodiimide: LA-1: (Carbodilite LA-1)

TABLE 3

| Examples | | Ex. 1 | Ex. 2 | Ex. 3 | Ex. 4 | Ex. 5 | C. Ex. 1 | C. Ex. 2 |
|---|---|---|---|---|---|---|---|---|
| Manufacturing conditions | | | | | | | | |
| Polylactic acid (component A) | — | A3 | A3 | A3 | A3 | A3 | PLLA1 | PLLA1 |
| Acrylic resin (component B) | — | B1 | B1 | B1 | B1 | B1 | B1 | B1 |
| Component A/component B | Weight ratio | 50/50 | 50/50 | 50/50 | 50/50 | 50/50 | 50/50 | 50/50 |
| Film forming conditions | | | | | | | | |
| Longitudinal draw ratio | (Times) | 1.1 | 1.3 | 1.5 | 1.5 | 1.5 | 1.5 | 1.5 |
| Transverse draw ratio | (Times) | 1.5 | 1.5 | 2.0 | 2.0 | 2.0 | 2.0 | 2.0 |
| Stretching temperature | (° C.) | 100 | 100 | 100 | 100 | 100 | 100 | 100 |
| Heat setting temperature | (° C.) | 140 | 140 | 140 | 150 | 160 | 120 | 150 |
| Physical properties of film | | | | | | | | |
| Thickness | (μm) | 41 | 41 | 41 | 41 | 41 | 41 | 41 |
| 90° C. Heat shrinkage factor (Note 2)MD/TD | (%) | 0.15/4.0 | 0.5/4.0 | 1.5/4.0 | 0.3/1.0 | 0.2/0.3 | 7.0/8.0 | 7.0/8.0 |
| Haze Untreated/90° C. (Note 2) | (%) | 0.15*/3.0 | 0.15*/6.0 | 0.1*/4.0 | 0.1/0.3 | 0.1/0.2 | 0.5/20 | 12/20 |
| Stereo crystal rate (S) | (%) | 100 | 100 | 100 | 100 | 100 | 0 | 0 |
| In-plane phase difference(Re) | (nm) | 4.0 | 3.2 | 3.2 | 2.0 | 1.5 | 4.0 | 3.5 |
| Phase difference in thickness direction(Rth) | (nm) | 3.5 | 2.5 | 2.5 | 2.1 | 1.2 | 5.0 | 3.0 |
| Polarizing plate durability | — | ○ | ○ | ○ | ○ | ○ | X | X |
| Photoelastic coefficient | ×10$^{-12}$/Pa | 2 | 2 | 2 | 2 | 2 | 2 | 2 |

(Note 2):
when the sample was heated at 90° C. for 5 hours
Ex.: Example C. Ex.: Comparative Example For your reference, as for the physical properties of TACPHAN manufactured by OFOHIGHTECHFILM GMBH which is a commercially available TAC film, the film had a total light transmittance of 92% or more, a photoelastic coefficient of 15×10$^{-12}$/Pa and a 90° C. heat shrinkage factor of 0.1%.

As easily understood from the above results, the films of the present invention have excellent transparency, a small photoelastic coefficient and a small heat shrinkage factor whereas the films of Comparative Examples and the TAC film are unsatisfactory in almost all the physical properties.

Examples 6 to 8

Films were formed, stretched and heated under the same conditions as in Example 3 except that the weight ratio of the polylactic acid (A3) and the acrylic resin (B1) was changed to obtain biaxially oriented films. The results are shown in Table 4.

Example 9

The results obtained by changing the longitudinal draw ratio and the transverse draw ratio to 1.1 times in Example 3 are shown in Table 4.

Examples 10 to 12

Films were formed, stretched and heated under the same conditions as in Example 3 except that the polylactic acid (A3) was changed to the resin shown in Table 2 to obtain biaxially oriented films. The results are shown in Table 4.

TABLE 4

| Examples | | Ex. 6 | Ex. 7 | Ex. 8 | Ex. 9 | Ex. 10 |
|---|---|---|---|---|---|---|
| Manufacturing conditions | | | | | | |
| Polylactic acid (component A) | — | A3 | A3 | A3 | A3 | A1 |
| Acrylic resin (component B) | — | B1 | B1 | B1 | B1 | B1 |
| Component A/Component B | Weight ratio | 70/30 | 50/50 | 30/70 | 50/50 | 70/30 |
| Film forming conditions | | | | | | |
| Longitudinal draw ratio | (Times) | 1.5 | 1.5 | 1.5 | 1.1 | 1.5 |
| Transverse draw ratio | (Times) | 2.0 | 2.0 | 2.0 | 1.1 | 2.0 |
| Stretching temperature | (° C.) | 100 | 100 | 100 | 100 | 100 |
| Heat setting temperature | (° C.) | 150 | 150 | 150 | 150 | 150 |
| Physical properties of film | | | | | | |
| Thickness | (μm) | 41 | 41 | 41 | 41 | 41 |
| 90° C. Heat shrinkage factor (Note 2)MD/TD | (%) | 0.1/0.3 | 0.1/0.3 | 0.1/0.3 | 0.1/0.1 | 0.1/0.3 |
| Haze Untreated/90° C. (Note 2) | (%) | 0.15/0.3 | 0.15/0.3 | 0.15/0.3 | 0.1/0.15 | 2.0/2.0 |
| Stereo crystal rate (S) | (%) | 100 | 100 | amorphous | 100 | 80 |
| In-plane phase ifference(Re) | (nm) | 30 | 3 | 0 | 3 | 30 |

TABLE 4-continued

| | | | | | | |
|---|---|---|---|---|---|---|
| Phase difference in thickness direction(Rth) | (nm) | 28 | 5 | 2.5 | 5 | 2.8 |
| Polarizing plate durability | — | — | ○ | ○ | ○ | ○ | ○ |
| Photoelastic coefficient | ×10$^{-12}$/Pa | 4.5 | 2 | 0 | 2 | 4.5 |

| Examples | | Ex. 11 | Ex. 12 | C. Ex. 3 | C. Ex. 4 |
|---|---|---|---|---|---|
| Manufacturing conditions | | | | | |
| Polylactic acid (component A) Type | | A2 | A3 | A3 | — |
| Acrylic resin (component B) Type | | B1 | B2 | — | B2 |
| Component A/Component B | Weight ratio | 70/30 | 60/40 | 100/— | —/100 |
| Film forming conditions | | | | | |
| Longitudinal draw ratio | (Times) | 1.5 | 1.5 | 1.5 | 1.5 |
| Transverse draw ratio | (Times) | 2.0 | 2.0 | 2.0 | 2.0 |
| Stretching temperature | (° C.) | 100 | 120 | 80 | 130 |
| Heat setting temperature | (° C.) | 150 | 150 | 150 | 150 |
| Physical properties of film | | | | | |
| Thickness | (μm) | 41 | 41 | 41 | 41 |
| 90° C. Heat shrinkage factor (Note 2) MD/TD | (%) | 0.1/0.3 | 0.1/0.1 | 0.5/0.8 | 0.1/0.1 |
| Haze Untreated/90° C. (Note 2) | (%) | 2.0/2.0 | 0.1/0.1 | 0.1/0.1 | 0.1/0.1 |
| Stereo crystal rate (S) | (%) | 97 | 100 | 100 | 100 |
| In-plane phase difference(Re) | (nm) | 30 | 0 | 70 | −20 |
| Phase difference in thickness direction(Rth) | (nm) | 28 | 0 | 70 | −20 |
| Polarizing plate durability | — | ○ | ○ | X | ○ |
| Photoelastic coefficient | ×10$^{-12}$/Pa | 4.5 | 3 | 8 | −7 |

(Note 2):
when the sample was heated at 90° C. for 5 hours (III) Raw Materials Used in Examples 13 to 21

(1) Polylactic Acid (Component A):
Polylactic acid (A4) was manufactured from PLLA2 and PDLA2 of the following Production Examples and used.
(2) Acrylic Resin (Component B):
The Acrypet VH001 (B1) of Mitsubishi Rayon Co., Ltd. was used.

Production Example 1-3

Manufacture of Poly(L-Lactic Acid) (PLLA2)

0.005 part by weight of tin octylate was added to 100 parts by weight of L-lactide (manufactured by Musashino Kagaku Kenkyusho Co., Ltd., optical purity of 100%) and reacted with the L-lactide in a nitrogen atmosphere by a reactor having a stirring blade at 180° C. for 2 hours, and phosphoric acid as a catalyst deactivator was added to the tin octylate in an equivalent ratio of 1.2:1. Thereafter, the residual lactide was removed at 13.3 Pa, and the obtained product was formed into a chip to obtain poly(L-lactic acid) (PLLA2).

The obtained L-lactic acid (PLLA2) had a weight average molecular weight (Mw) of 171,000, a glass transition point (Tg) of 55° C., a melting point of 175° C., a carboxyl group content of 13 eq/ton and a lactide content of 330 ppm.

Production Example 1-4

Manufacture of Poly(D-Lactic Acid) (PDLA2)

Polymerization was carried out under the same conditions except that the L-lactide of Production Example 1-3 was changed to D-lactide (manufactured by Musashino Kagaku Kenkyusho Co., Ltd., optical purity of 100%) to obtain poly (D-lactic acid) (PDLA2). The obtained poly(D-lactic acid) (PDLA2) had a weight average molecular weight of 171,000, a glass transition point (Tg) of 55° C., a melting point of 175° C., a carboxyl group content of 15 eq/ton and a lactide content of 350 ppm. The results are shown in Table 5.

TABLE 5

| | | Production Example | |
|---|---|---|---|
| | | Production Example 1-3 PLLA2 | Production Example 1-4 PDLA2 |
| Tm | (° C.) | 175 | 175 |
| Tg | (° C.) | 55 | 55 |
| Mw | (×10$^4$) | 17.1 | 17.1 |
| Lactide content | (ppm) | 330 | 350 |

Production Example 2-4

Manufacture of Polylactic Acid (A4)

100 parts by weight of a mixture of PLLA2 manufactured in Production Example 1-3 and PDLA2 manufactured in Production Example 1-4 in a weight ratio shown in Table 6 and 0.1 part by weight of a phosphoric ester metal salt (Adekastab NA-71 of ADEKA Co., Ltd.) as an accelerator for forming stereo crystals were uniformly mixed together by a blender. Thereafter, the resulting mixture was vacuum dried at 110° C. for 5 hours and fed from the first feed port of a double-screw kneader to be melt kneaded for a residence time of 2 minutes while air was evacuated at a cylinder temperature of 230° C. and a vent pressure of 13.3 Pa. Thereafter, a strand was extruded into a water tank and formed into a chip with a strand cutter to obtain polylactic acid (A4). The weight average molecular weight (Mw), stereo crystal rate and crystal melting temperature of the obtained polylactic acid (A4) are shown in Table 6.

TABLE 6

|  |  |  | Production Example Production Example 2-4 |
|---|---|---|---|
| Composition | Name | — | A4 |
|  | Polylactic acid | Type | PLLA2/PDLA2 |
|  |  | Weight ratio | 50/50 |
|  | Accelerator for forming stereo crystals | Type | NA-71 |
|  |  | Weight ratio | 0.1 |
| Physical properties | Weight average molecular weight | (×10$^4$) | 16.2 |
|  | Stereo crystal rate | (%) | 100 |
|  | Crystal melting temperature | (° C.) | 218 |

Accelerator for forming stereo crystals: phosphoric ester metal salt, NA-71 manufactured by ADEKA Co., Ltd., Adekastab NA-71

Examples 13 to 15

After the polylactic acid (A4) obtained in Production Example 2-4 and the acrylic resin (B1) were mixed together in a weight ratio shown in Table 7, the mixture was dried with hot air at 110° C. for 5 hours. Then, the mixture was melt kneaded by an extruder at a cylinder temperature of 230° C. to be melt extruded into a film form having a thickness of about 50 μm at a die temperature of 230° C., and the film was brought into close contact with the surface of a mirror-surface cooling drum to be solidified so as to obtain an unstretched film. The Tc's of the unstretched films were 115° C., 122° C. and 138° C., and the Tm* of the films was 215° C. The unstretched films were stretched to 1.05 to 1.1 times in the longitudinal and transverse directions at a temperature of Tg+10° C. and heat set at 110 to 180° C. to obtain biaxially oriented films having a thickness of about 40 μm. The DMA characteristics, form stabilities and other results of the obtained films are shown in Table 7.

TABLE 7

| Examples |  | Ex. 13 | Ex. 14 | Ex. 15 |
|---|---|---|---|---|
| Film composition |  |  |  |  |
| Polylactic acid (component A) | Type | A4 | A4 | A4 |
|  | amount | 90 | 70 | 60 |
| Acrylic resin (component B) | Type | B1 | B1 | B1 |
|  | amount | 10 | 30 | 40 |
| Film forming conditions |  |  |  |  |
| Draw ratio | (TD/MD) | 1.05/1.05 | 1.07/1.07 | 1.1/1.1 |
| Stretching temperature | (° C.) | 72 | 75 | 80 |
| Heat setting temperature | (° C.) | 140 | 140 | 170 |
| Physical properties of unstretched film |  |  |  |  |
| Crystallization temperature | (Tc: ° C.) | 115 | 122 | 138 |
| Crystal melting start temperature | (Tm*: ° C.) | 215 | 215 | 215 |

TABLE 7-continued

| Examples |  | Ex. 13 | Ex. 14 | Ex. 15 |
|---|---|---|---|---|
| Physical properties of film |  |  |  |  |
| High-temperature mechanical properties (DMA) | (existence of minimum value) | None | None | None |
| E' value at 150° C. | (MPa) | 200 | 100 | 50 |
| Form stability | — | ○ | ○ | ○ |
| Other physical properties |  |  |  |  |
| Stereo crystal rate | (%) | 100 | 100 | 100 |
| Stereo crystallization | (%) | 35 | 20 | 10 |
| Thickness | (μm) | 40 | 40 | 40 |
| Photoelastic coefficient | (×10$^{-12}$/Pa) | 7 | 4.5 | 3 |
| In-plane phase difference | (Re: nm) | 0 | 0 | 0 |
| Phase difference in thickness direction | (Rth: nm) | 10 | 10 | 10 |

B1: Acrypet VH001 of Mitsubishi Rayon Co., Ltd.
DMA physical properties (existence or absence of minimum value)
Absence: no minimum value appears at a temperature range from room temperature (25° C.) to 150° C.
Existence: minimum value appears at a temperature range from room temperature (25° C.) to 150° C.

Examples 16 to 18

A mixture resin of polylactic acid (component A) and acrylic resin (component B) of types shown in Table 8 in a weight ratio shown in Table 8 was dried with hot air at 110° C. for 5 hours, melt kneaded by an extruder at a cylinder temperature of 230° C. to be melt extruded into a film form having a thickness of 50 to 200 μm at a die temperature of 230° C., and the film was brought into close contact with the surface of a mirror-surface cooling drum to be solidified so as to obtain an unstretched film.

The obtained unstretched film had a Tc of 138° C. and a Tm of 215° C. The unstretched film was stretched at a temperature of (Tg+10)° C. in the longitudinal and transverse directions under the conditions shown in Table 8 and further heat set at 140° C. to obtain a biaxially oriented film having a thickness of 40 to 80 μm.

As easily understood from Table 8, when the DMA physical properties satisfy the conditions of the present invention, form stability is excellent and optical properties are also excellent.

TABLE 8

| Examples |  | Ex. 16 | Ex. 17 | Ex. 18 |
|---|---|---|---|---|
| Film composition |  |  |  |  |
| Polylactic acid (component A) | Type | A4 | A4 | A4 |
|  | amount | 60 | 60 | 60 |
| Acrylic resin (component B) | Type | B1 | B1 | B1 |
|  | amount | 40 | 40 | 40 |
| Film forming conditions |  |  |  |  |
| Draw ratio | (TD/MD) | 1.7/2.5 | 2.2/3.0 | 1.6/2.0 |
| Stretching temperature | (° C.) | 80 | 80 | 80 |
| Heat setting temperature | (° C.) | 140 | 140 | 140 |

TABLE 8-continued

| Examples | | Ex. 16 | Ex. 17 | Ex. 18 |
|---|---|---|---|---|
| Physical properties of unstretched film | | | | |
| Crystallization temperature | (Tc: °C.) | 138 | 138 | 138 |
| Crystal melting start temperature | (Tm*: °C.) | 215 | 215 | 215 |
| Physical properties of film | | | | |
| High-temperature mechanical properties (DMA) | (existence of minimum value) | None | None | None |
| E' value at 150° C. | (MPa) | 50 | 50 | 50 |
| Form stability | — | ○ | ○ | ○ |
| Other physical properties | | | | |
| Stereo crystal rate | (%) | 100 | 100 | 100 |
| Stereo crystallization | (%) | 15 | 20 | 10 |
| Thickness | (μm) | 40 | 40 | 80 |
| Photoelastic coefficient | (×10$^{-12}$/Pa) | 3 | 3 | 3 |
| In-plane phase difference | (Re: nm) | −30 | −30 | −30 |
| Phase difference in thickness direction | (Rth: nm) | 100 | 120 | 120 |

B1: Acrypet VH001 of Mitsubishi Rayon Co., Ltd.
DMA physical properties (absence or existence of minimum value)
absence: no minimum value appears at a temperature range from room temperature (25° C.) to 150° C.
existence: minimum value appears at a temperature range from room temperature (25° C.) to 150° C.

Examples 19 to 21

A mixed resin of polylactic acid (component A) and acrylic resin (component B) of the types shown in Table 9 in a weight ratio shown in Table 9 was dried with hot air at 110° C. for 5 hours and melt kneaded by an extruder at a cylinder temperature of 230° C. to be melt extruded into a film form having a thickness of about 50 to 200 μm at a die temperature of 230° C., and the film was brought into close contact with the surface of a mirror-surface cooling drum to be solidified so as to obtain an unstretched film.

The unstretched film had a Tc of 115 to 138° C. and a Tm of 215° C. The unstretched film was stretched in the longitudinal and transverse directions at a temperature of (Tg+10)° C. under the conditions shown in Table 9 and further heat set at 110 to 140° C. to obtain a biaxially oriented film having a thickness of about 40 μm.

As easily understood from Table 9, when the DMA physical properties satisfy the conditions of the present invention, form stability is excellent and optical properties are also excellent.

TABLE 9

| Examples | | Ex. 19 | Ex. 20 | Ex. 21 |
|---|---|---|---|---|
| Film composition | | | | |
| Polylactic acid (component A) | Type | A4 | A4 | A4 |
| | amount | 90 | 70 | 60 |
| Acrylic resin (component B) | Type | B1 | B1 | B1 |
| | amount | 10 | 30 | 40 |
| Film forming conditions | | | | |
| Draw ratio | (TD/MD) | 1.4/1.7 | 1.5/2.0 | 2.2/3.0 |
| Stretching temperature | (° C.) | 72 | 75 | 80 |
| Heat setting temperature | (° C.) | 140 | 140 | 140 |
| Physical properties of unstretched film | | | | |
| Crystallization temperature | (Tc: °C.) | 115 | 122 | 138 |
| Crystal melting start temperature | (Tm*: °C.) | 215 | 215 | 215 |
| Physical properties of film | | | | |
| High-temperature mechanical properties (DMA) | (existence of minimum value) | None | None | None |
| E' value at 150° C. | (MPa) | 200 | 100 | 50 |
| Form stability | — | ○ | ○ | ○ |
| Other physical properties | | | | |
| Stereo crystal rate | (%) | 100 | 100 | 100 |
| Stereo crystallization | (%) | 35 | 25 | 20 |
| Thickness | (μm) | 40 | 40 | 40 |
| Photoelastic coefficient | (×10$^{-12}$/Pa) | 7 | 5 | 3 |
| In-plane phase difference | (Re: nm) | −30 | −30 | −30 |
| Phase difference in thickness direction | (Rth: nm) | 130 | 130 | 120 |

B1: Acrypet VH001 of Mitsubishi Rayon Co., Ltd.

EFFECT OF THE INVENTION

The film of the present invention has a small change in birefringence caused by external force, excellent dimensional stability at the time of heating and a small change in birefringence caused by heat stress. Therefore, the film of the present invention may be used as a polarizing plate protective film for use in displays.

Since the phase differences of the film of the present invention can be controlled by changing the blending ratio of polylactic acid (component A) to acrylic resin (component B), the film may be used as a phase difference film having stable phase differences.

INDUSTRIAL FEASIBILITY

The film of the present invention can be used as a polarizing plate protective film. The film of the present invention can be used as a constituent member of a polarizing plate in a display such as liquid crystal display, plasma display, organic EL display, field emission display or rear projection TV.

Since the film of the present invention can reproduce phase differences stably and has a small photoelastic coefficient, it can be advantageously used as a phase difference film. The film of the present invention can be used in an IPS (In Plane Switching) liquid crystal display.

The invention claimed is:

1. A film made of a resin composition which comprises polylactic acid (component A) composed of poly(L-lactic acid) and poly(D-lactic acid) and acrylic resin (component B) and has a crystal melting peak at 190° C. or higher when measured by a differential scanning calorimeter (DSC), and wherein the film satisfies the condition that the storage elastic modulus E' in the measurement of dynamic viscoelasticity (DMA) does not take a minimum value at a temperature range from normal temperature (25° C.) to 150° C. and has a value larger than $0.5 \times 10^8$ Pa, and
   wherein the film has a haze value of 6.0% or less when the film is heated at 90° C. for 5 hours.

2. The film according to claim 1, wherein the weight ratio (A/B) of the polylactic acid (component A) to the acrylic resin (component B) is 90/10 to 50/50.

3. The film according to claim 2 which has an absolute value of photoelastic coefficient of less than $10 \times 10^{-12}$/Pa.

4. The film according to claim 1 which has an absolute value of photoelastic coefficient of less than $10 \times 10^{-12}$/Pa.

5. The film according to claim 1, which has a phase difference (Re) in the plane direction of the film defined by the following equation (ii) and which has a phase difference (Rth) in the thickness direction defined by the following equation (iii) are both 10 nm or less:

$$Re = (nx - ny) \times d \qquad \text{(ii)}$$

$$Rth = ((nx + ny)/2 - nz) \times d \qquad \text{(iii)}$$

wherein nx represents the refractive index in the longitudinal direction, ny represents the refractive index in the transverse direction, nz represents the refractive index in the thickness direction, and d represents a thickness (nm).

6. The film according to claim 1, which has a stereo crystal rate (S) defined by the following equation (i) is 80% or more:

$$S(\%) = [\Delta Hms/(\Delta Hmh + \Delta Hms)] \times 100 \qquad \text{(i)}$$

wherein $\Delta Hms$ represents the crystal melting enthalpy (J/g) of stereocomplex-phase polylactic acid, and $\Delta Hmh$ represents the crystal melting enthalpy (J/g) of homo-phase polylactic acid.

7. The film according to claim 1 which has a heat shrinkage factor in the longitudinal direction and the transverse direction of 5% or less when it is heated at 90° C. for 5 hours.

8. The film according to claim 1 which has a stereo crystallinity (K) defined by the following equation (iv) of 10 to 60%:

$$K = (\Delta Hms - \Delta Hc)/142 \qquad \text{(iv)}$$

wherein $\Delta Hms$ represents the crystal melting enthalpy (J/g) of stereocomplex polylactic acid, $\Delta Hc$ represents the crystallization enthalpy (J/g) of polylactic acid, and 142 (J/g) represents the equilibrium melting enthalpy of the stereocomplex polylactic acid crystal.

9. A polarizing plate protective film which is the film of claim 1.

10. A phase difference film which is the film of claim 1.

* * * * *

UNITED STATES PATENT AND TRADEMARK OFFICE
CERTIFICATE OF CORRECTION

PATENT NO. : 8,647,738 B2  
APPLICATION NO. : 12/677262  
DATED : February 11, 2014  
INVENTOR(S) : Kohei Endo Page 1 of 1

It is certified that error appears in the above-identified patent and that said Letters Patent is hereby corrected as shown below:

In the Claims

Column 31, lines 17-18:

Delete "3. The film according to claim 2 which has an absolute value of photoelastic coefficient of less than $10 \times 10^{-12}$/Pa."

Insert --3. The film according to claim 1 which has an absolute value of photoelastic coefficient of less than $10 \times 10^{-12}$/Pa.--

Signed and Sealed this  
Tenth Day of November, 2015

Michelle K. Lee  
*Director of the United States Patent and Trademark Office*